US010801945B2

(12) United States Patent
Schuda et al.

(10) Patent No.: US 10,801,945 B2
(45) Date of Patent: Oct. 13, 2020

(54) INLINE PARTICLE SENSOR (71) Applicant: CyberOptics Corporation, Golden Valley, MN (US)

(72) Inventors: Felix J. Schuda, Saratoga, CA (US); Ferris J. Chen, Taichung (TW)

(73) Assignee: CyberOptics Corporation, Golden Valley, MN (US)

(*) Notice: Subject to any disclaimer, the term of this patent is extended or adjusted under 35 U.S.C. 154(b) by 0 days.

(21) Appl. No.: 16/380,280

(22) Filed: Apr. 10, 2019

(65) Prior Publication Data
US 2019/0317008 A1 Oct. 17, 2019

Related U.S. Application Data (60) Provisional application No. 62/655,903, filed on Apr. 11, 2018.

(51) Int. Cl.
*G01N 15/14* (2006.01)

(52) U.S. Cl.
CPC ..... *G01N 15/1434* (2013.01); *G01N 15/1404* (2013.01)

(58) Field of Classification Search
CPC .............. G01N 15/1434; G01N 15/1404
USPC ........................................................ 356/338
See application file for complete search history.

(56) References Cited

U.S. PATENT DOCUMENTS

| 5,041,361 | A | * | 8/1991 | Tsuo | G03F 7/0043 216/2 |
| 5,255,089 | A | * | 10/1993 | Dybas | H04N 7/183 250/574 |
| 5,271,264 | A | * | 12/1993 | Chanayem | G01N 33/0009 73/28.01 |
| 5,319,575 | A | * | 6/1994 | Lilienfeld | G01N 21/53 702/26 |
| 5,459,569 | A | * | 10/1995 | Knollenberg | G01N 21/53 250/574 |
| 5,501,113 | A | * | 3/1996 | Harrison | G01N 15/02 73/865.5 |
| 6,532,069 | B1 | * | 3/2003 | Otsuki | G01N 1/24 356/338 |
| 7,265,832 | B2 | * | 9/2007 | Montgomery | G01F 1/661 356/338 |
| 7,511,814 | B2 | * | 3/2009 | Otsuki | C23C 16/4405 356/338 |

(Continued)

OTHER PUBLICATIONS

International Search Report and Written Opinion dated Apr. 10, 2019, for International Patent Application No. PCT/US2019/026773, 10 pages.

(Continued)

*Primary Examiner* — Roy M Punnoose
(74) *Attorney, Agent, or Firm* — Christopher R. Christenson; Kelly, Holt & Christenson PLLC (57) ABSTRACT An inline particle sensor includes a sensor head configured to mount within a fitting, the sensor head including a laser source sealed and isolated from a sensing volume and configured to emit a laser beam through the sensing volume and a detector arranged to detect particles in the sensing volume that pass through the laser beam. The vacuum particle sensor further includes electronics coupled to the sensor head and configured to receive a signal indicative of the particles from the detector and provide a particle output based on the signal.

16 Claims, 5 Drawing Sheets

(56) References Cited

U.S. PATENT DOCUMENTS

| | | | | |
|---|---|---|---|---|
| 7,667,839 B2* | 2/2010 | Bates | ................. | G01N 15/1459 |
| | | | | 356/337 |
| 7,948,621 B2* | 5/2011 | Burns | ................. | G01N 15/0205 |
| | | | | 356/336 |
| 2005/0185180 A1* | 8/2005 | Moore | ................... | B24B 37/04 |
| | | | | 356/343 |
| 2010/0201984 A1* | 8/2010 | Schuda | ................. | G01N 21/53 |
| | | | | 356/338 |

OTHER PUBLICATIONS

"Vaculaz®", Operators Manual, Particle Measuring Systems, Nov. 1992, 36 pages.

First Taiwan Office Action dated May 28, 2020 for Taiwan Patent Application No. 108112670, 21 pages including English transiation.

"For high temperature deposition envronments", HYT 70EX/ 70XEL Vacuum Particle Sensors, retrieved at <<www.hachultra. com>>, 2 pages, Published 2006. http://www.hachultra.ru/files/ 70XE_ed1_datasheet.pdf.

"Vaculaze®". Operators Manual, Particle Measuring Systems, Nov. 1992, 38 pages.

* cited by examiner

INLINE PARTICLE SENSOR

CROSS-REFERENCE TO RELATED APPLICATIONS

The present application is based on and claims the benefit of U.S. Provisional Patent Application Ser. No. 62/655,903, filed Apr. 11, 2018, the content of which is hereby incorporated by reference in its entirety.

BACKGROUND

During the manufacture of semiconductor wafers, there are multiple tools and processes to which a wafer is exposed. During each of these steps, there are potential defects that may be caused by process conditions that can cause degradation in the yield of the final integrated circuit devices due to microscopic particles being deposited on the wafer's surface. This is important because each wafer may contain the circuitry for tens or even hundreds of integrated circuit devices and a single lost wafer may result in hundreds or thousands of dollars' worth of scrap. Even a few particles can negatively affect the quality of the wafer. Thus, it is critical to employ a very sensitive sensing means to monitor small amounts of particulates before and during the various stages of semiconductor wafer processing.

SUMMARY

In one embodiment, an inline particle sensor includes a sensor head configured to mount within a fitting, the sensor head including a laser source configured to emit a beam through a sensing volume and a detector arranged to detect laser light scattered from particles passing through the sensing volume. The inline particle sensor further includes electronics coupled to the sensor head and configured to receive a signal from the detector indicative of the particles. The electronics produce an output that indicates the presence of detected particles.

In another embodiment, an inline particle sensor system includes a vacuum pump, a vacuum pump line, a semiconductor wafer process chamber, and a fitting fluidically coupled to the vacuum pump line between the vacuum pump and the wafer process chamber. The inline particle sensor system further includes an inline particle sensor coupled to the fitting and configured to sense a characteristic of particles with the sensor system and generate a sensor signal indicative of the characteristic of the particles; and electronics coupled to the vacuum particle sensor configured to receive the sensor signal and generate a particle output based on the sensor signal.

In another embodiment, an inline particle sensor system includes a process chamber, a vacuum pump line coupled to the process chamber and configured to allow fluid flow from the process chamber into the vacuum pump line; a first vacuum pump coupled to the vacuum pump line; a second vacuum pump coupled to the vacuum pump line; and a fitting fluidically coupled to the vacuum pump line between the first and second vacuum pumps and between one of either the first or second vacuum pumps and the process chamber. The inline particle sensor system further includes a inline particle sensor coupled to the fitting and configured to sense a characteristic of the particles within the system and generate a sensor signal indicative of the characteristic; and electronics coupled to the sensor configured to receive the sensor signal and determine a particle output based on the sensor signal.

DETAILED DESCRIPTION OF ILLUSTRATIVE EMBODIMENTS

Semiconductor wafer processes are often sensitive to particle contamination inside the process chamber. The particulates may originate from mechanical elements inside the chamber or from other sources. As disclosed below, an inline particle sensor is provided as a diagnostic sensor that allows the user to monitor particles either in the main chamber or in the pump lines to see when particles are produced. By correlating particle bursts or other suitable detection patterns in the sensor output with steps in the procedure, the user can more easily and effectively diagnose problems.

One particularly challenging process is extreme ultraviolet (EUV) lithography. In EUV, a plasma is converted into light having a wavelength of about 13.5 nanometers. This light then bounces off several mirrors and impinges upon a wafer. It is believed that EUV will allow processing down to the 5-nanometer scale. As can be appreciated, the effects of any particles or impurities in the system are magnified as the printed features become smaller. The EUV process itself can be a source of unwanted particulates, as well.

Embodiments described below generally provide an optical particle sensor that is configured to be insertable into a vacuum system, either in a main chamber or into one of the vacuum pump lines. Important aspects of the disclosed embodiments include: ease with which the sensor may be inserted into and removed from a vacuum system; how the sensor can be inserted into pump lines, particularly the line between the low vacuum and high vacuum pumps so that the sensor can potentially sense particulates generated in the main chamber; how the shape and alignment of the laser beam in the sensing region, in coordination with the arrangement of scattered light collection, maximizes the detection of individual particles; and how the sensor can sense more particles and smaller particles by using a high-power, short wavelength (such as blue or UV) laser.

Figure 1:
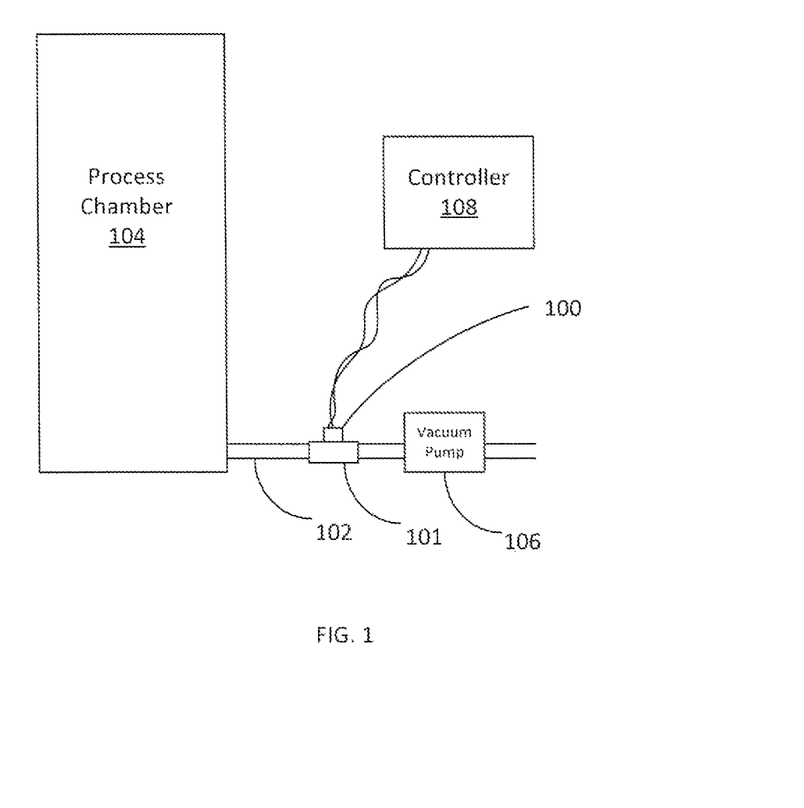
FIG. 1 is a diagrammatic view of components of an inline particle sensing system operating in a semiconductor processing environment in accordance with an embodiment of the present invention.

FIG. 1 is a diagrammatic view of components of an inline particle sensing system operating in a semiconductor processing environment in accordance with an embodiment of the present invention. As shown in FIG. 1, inline particle sensor 100 is coupled to fitting 101 and is fluidically interposed between process chamber 104 and vacuum pump 106 on vacuum pump line 102. In one embodiment, line 102 is a hydrogen exhaust line for process chamber 104. In one particular example, line 102 conveys hydrogen exhaust at a flow rate of about 2.73 Pa m$^3$/s at a pressure of about 17 Pa. In one example, line 102 is a pipe having a diameter of about 85 mm. As illustrated, inline particle sensor 100 is located outside of process chamber 104 and before vacuum pump 106. However, embodiments can be practiced where the sensor is mounted to process chamber 104 or other suitable semiconductor processing tools/environments. Further, sensor 100 can also be fluidically interposed on a vacuum line between high and low vacuum pumps. In another embodiment, the inline particle sensor may also be located in the exhaust line from the low vacuum pump to atmosphere.

Sensor 100 is communicatively coupled to controller 108. Controller 108 collects and may store signal information from sensor 100 and processes the signal information in order to provide an output indicative of qualitative and/or quantitative information on particles flowing through line 102. Additionally, controller 108 may also be connected, either physically or wirelessly, to a number of additional inline particle sensors disposed on other exhaust lines or fluid conduits in order to obtain a more comprehensive indication of particle flow relative to the semiconductor tool (e.g. process chamber 104). In one example, controller 108 is configured to connect to twelve separate inline particle sensors 100. The additional sensors may be coupled to different lines and/or multiple inline particle sensors may be coupled to the same line 102. In such a case, the multiple sensors may have their sensing areas disposed to detect particles in different regions of the cross-sectional area of the flow line. For example, a first particle sensor may sense a large part of a first half of a flow area in line 102, while a second inline particle sensor located proximate the first inline particle sensor may sense a large part of the second half of the flow area. Such a system could allow for a more complete sensing of particle presence in the line while not requiring a single larger and more complex sensing structure.

Figure 2:
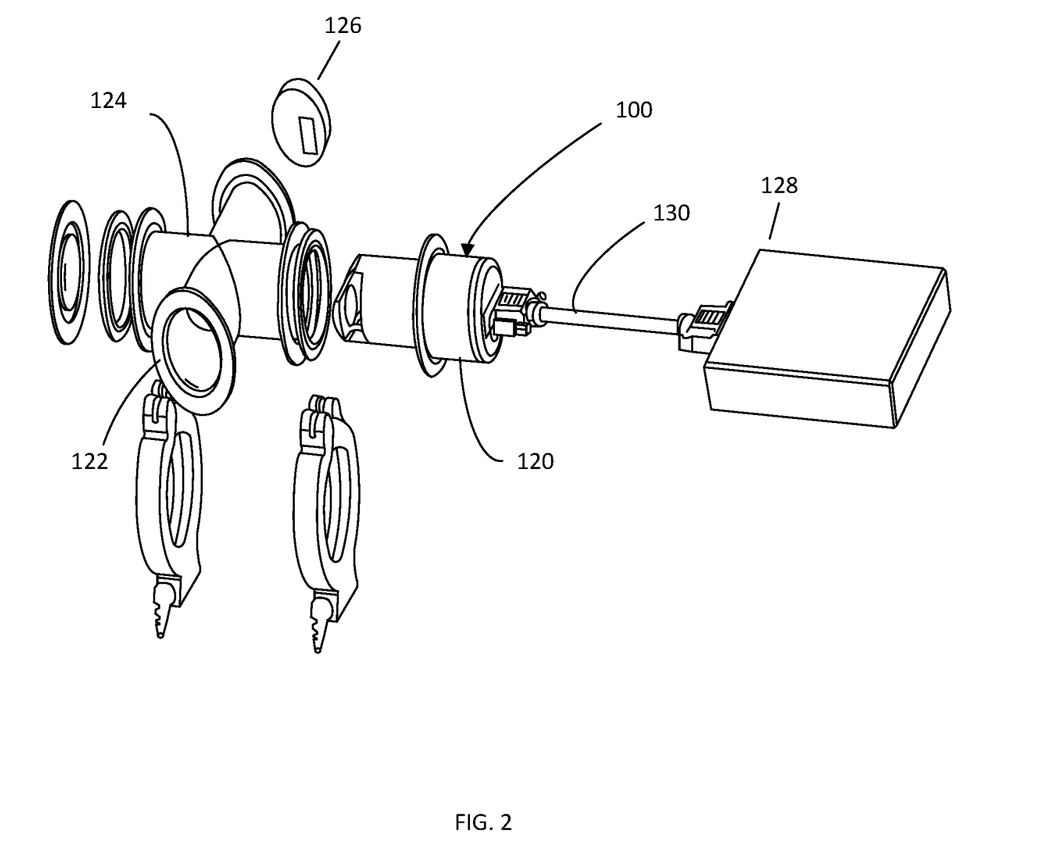
FIG. 2 is a diagrammatic view of an inline particle sensor in accordance with an embodiment of the present invention.

FIG. 2 is a diagrammatic view of an inline particle sensor in accordance with an embodiment of the present invention. Sensor 100 includes laser sensing head 120 that is sized and shaped to fit within a standard fitting, such as a standard KF50 cross fitting 122. Fitting 122 can be formed of any suitable material including, without limitation, stainless steel and aluminum. In one embodiment, sensing head 120 has a length of about 140 mm such that it extends substantially into leg 124 of fitting 122. Very small densities of unwanted particles in the gas flow can indicate poor process conditions, so it is imperative to have a sensing volume that captures as much of the gas and particle flow as possible. In one embodiment, sensing head 120, through the unique geometry of laser source optical elements and scattered light detection elements, configures the laser beam 'ribbon' in the sensing volume to be thin and of large cross sectional area relative to the gas and particle flow. For its size, this optical head arrangement of the inline particle sensor has a far larger sensing area than particle sensors for other types of environments. For example, in one embodiment, the sensing area is about 6 mm×6 mm, allowing the inline particle sensor to sample a substantially larger fraction of the pump line tube than typical existing sensors.

The unique geometry of approximately orthogonal gas and particle flow direction, laser beam propagation direction, and detection axis, combined with a large ribbon area presented to the particle flow and a thin laser beam in the flow direction, also permits efficient collection of scattered light, resulting in improved efficiency for detecting single particles. Because the laser beam is of large cross sectional area, but thin in the direction of particle flow, the laser beam can be maintained at very high intensity levels, correspondingly increasing the magnitude of the scattered light signal from a single particle. The small extent of the thin laser beam in the particle flow direction results in scattered light pulse of short duration, as well, which enables better discrimination of the detected scattered light pulse from background sources of noise and other signals that are not indicative of a detected particle.

Particles with diameters approximately the same size as the wavelength of the laser light and smaller than this, approximately 0.5 microns and below, are often the most important to control for semiconductor wafer processing. Their scattering properties present the most challenges: for the smallest diameters <20% of the laser wavelength, the scattering cross section decreases extremely rapidly. To detect these particles reliably, it is imperative to use a laser wavelength that is as short as possible while maintaining very high intensity. In one embodiment, the laser source operates at 0.450 microns wavelength and outputs up to 3 Watts. The amount of scattered light that can be detected depends strongly on the orientation of the laser polarization relative to the predominant detection direction. In one embodiment, the predominant detection axis is in the laser ribbon plane and the laser polarization direction is perpendicular to the plane of the laser ribbon, which maximizes the scattering in the predominant detection axis.

In the embodiment shown in FIG. 2, sensing head 120 includes preamplifiers and laser driver circuitry that is electrically coupled to electronics enclosure 128 via cable 130. Electronics within enclosure 128 are able to drive the laser source (not shown in FIG. 2) within sensing head 120 and to monitor an electrical response of an optical detector (not shown in FIG. 2) in order to detect the presence, size, and/or quantity of particles passing through the sensing area of sensing head 120. Further, electronics within enclosure 128 are configured to provide an electrical output to a controller, such as controller 108 (shown in FIG. 1). This may be done by transmitting a signal through a cable coupled enclosure to controller 108 (as shown in FIG. 1) or it may be done using a wireless communication protocol, such as the known Bluetooth or WiFi protocols.

Figure 3:
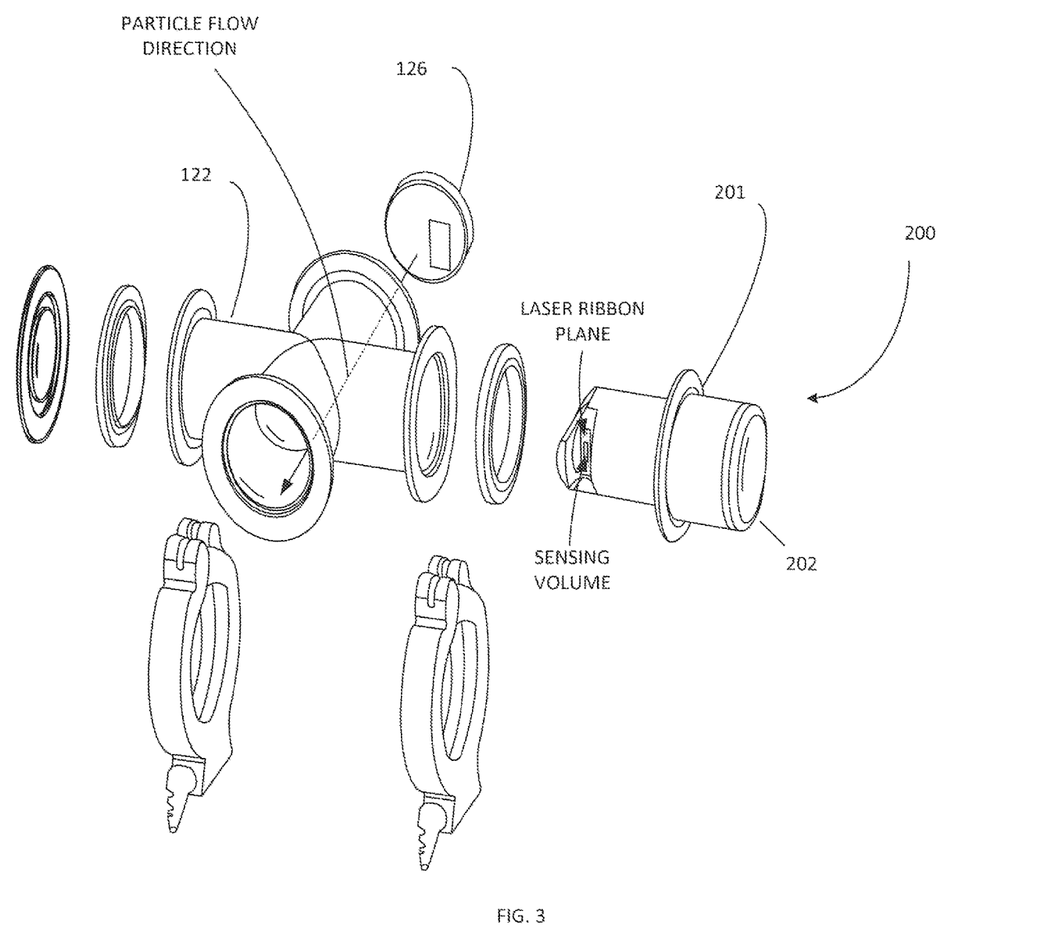
FIG. 3 is a diagrammatic view of an inline particle sensor in accordance with an embodiment of the present invention.

FIG. 3 is a diagrammatic view of an inline particle sensor in accordance with an embodiment of the present invention. The embodiment shown in FIG. 3 is similar to that of FIG. 2 and like components are numbered similarly. Inline particle sensor 200 is configured to fit within a standard fitting, such as KF50 cross fitting 122. Additionally, an optional flow restrictor 126 can be placed upstream of sensor 200 in order to direct particles through the sensing area of sensor 200. The main difference between sensor 200 and sensor 100 is that all of the electronics required for sensor 200 are disposed within sensor head 201 and endcap 202. Endcap 202, in one embodiment, may be formed of an RF transparent material, such as plastic. Further, endcap 202 may include a power input port that allows a power supply (such as a 5 VDC) power supply to couple to electronics within and sensor head 201 endcap 202. Additionally, endcap 202 may include one or more indicator LEDs. Such indicator LED's can provide useful information regarding the following events: power on, laser engaged, particle detected, and/or suitable troubleshooting codes. Sensor 200 may be electronically, or otherwise communicatively coupled to a controller (e.g. controller 108).

With both of the embodiments described with respect to FIGS. 2 and 3, the electrical components (such as electronics, laser source, and detector) are sealed and isolated from the gas flowing through the connector. This is an important feature for inline sensors and particularly those that operate to support the semiconductor processing industry.

Figure 4:
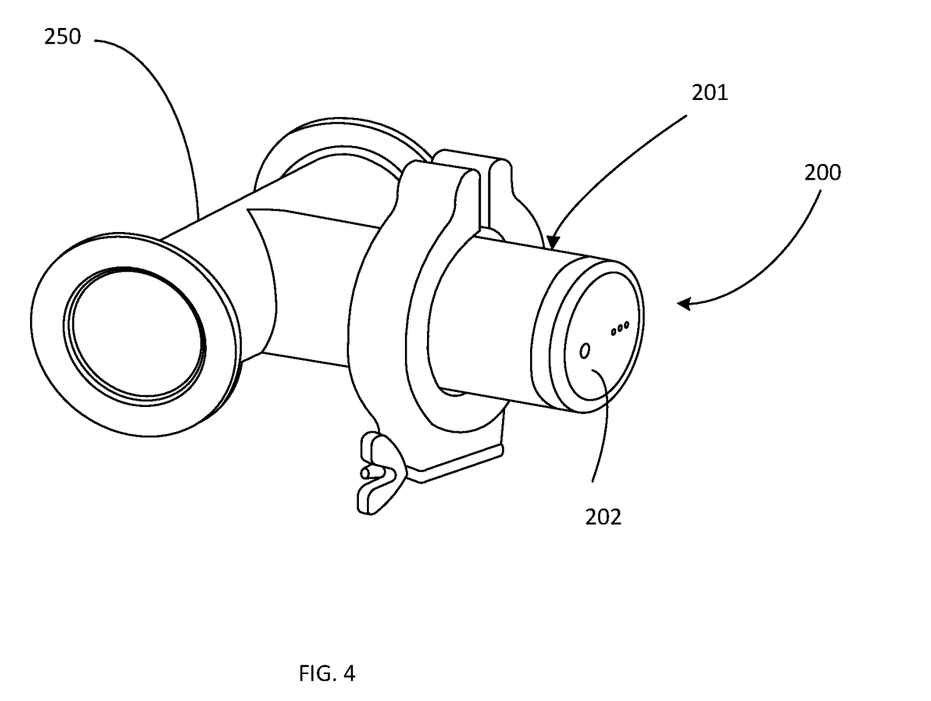
FIG. 4 is a diagrammatic view of an inline particle sensor in accordance with an embodiment of the present invention.

FIG. 4 is a diagrammatic view of an inline particle sensor in accordance with an embodiment of the present invention. Sensor 200 is coupled to a T connector 250 instead of the fitting 122 (e.g. KF50 cross connector) shown in FIG. 3. Accordingly, embodiments described herein can be practiced with any suitable type and/or size of connector or coupler including, without limitation, quick flanges, ISO fittings (such as ISO63), as well as fittings that are larger than or smaller than 50 mm. Embodiments generally provide an inline particle sensor that can be easily removed for recalibration or repair without disturbing the vacuum system.

With the embodiments described with respect to FIGS. 2, 3 and 4, the sensor is conveniently coupled to and separate from the fitting, the pump lines, and/or the process chamber or other suitable semiconductor processing tools/environments, such that it may be individually removed from the system, for inspection, repair, replacement, calibration and/or other maintenance operations. Additionally, because the electronics are either completely contained within the sensor, or externally coupled to it, operators may access or remove the electronics along with the sensor more easily.

Figure 5:
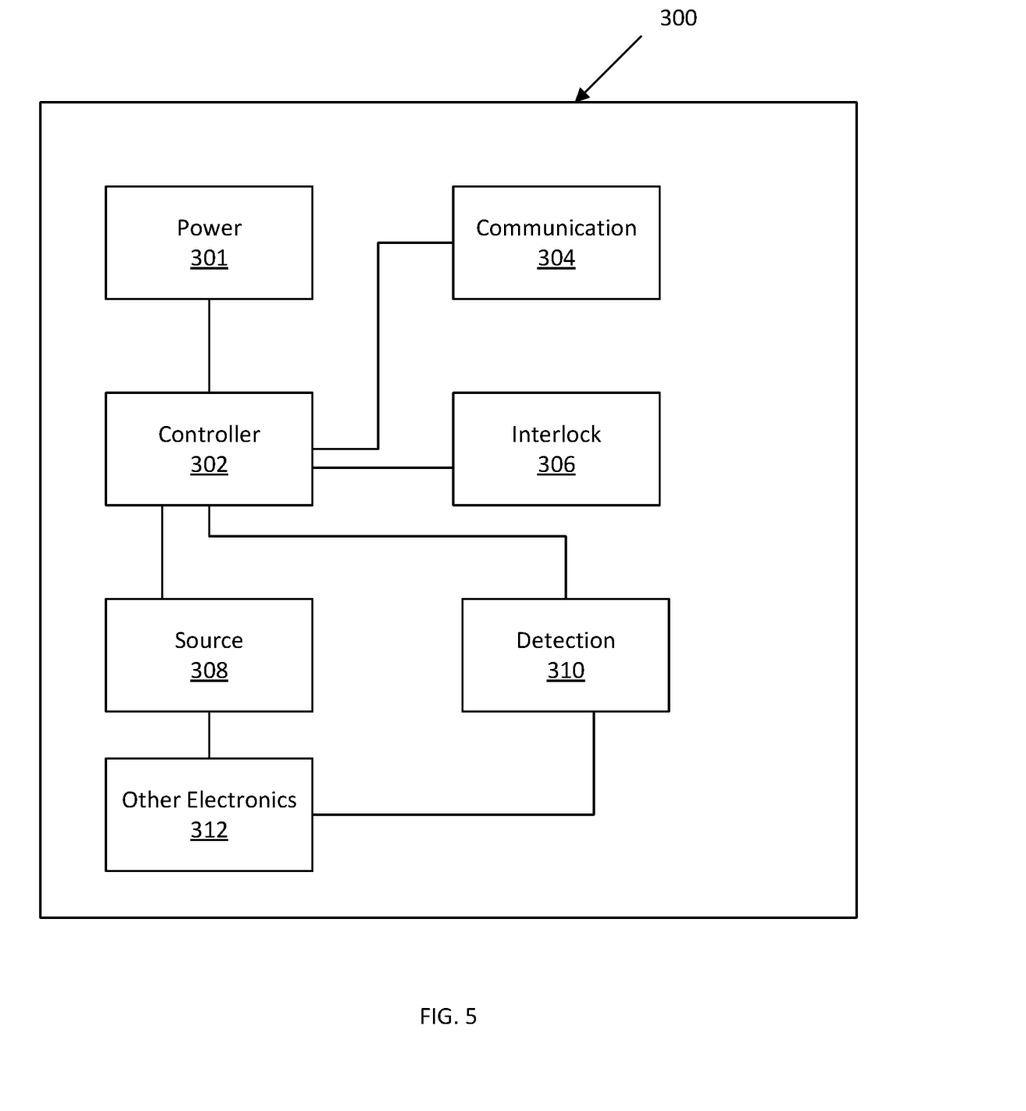
FIG. 5 is a block diagram of an inline particle sensor in accordance with an embodiment of the present invention.

FIG. 5 is a block diagram of an inline particle sensor in accordance with an embodiment of the present invention. Sensor 300 may comprise any of the above-described embodiments. Sensor 300 includes power module 301. In embodiments where sensor 300 is battery-powered, power module 301 may include a battery, such as a rechargeable battery. However, power module 300 also includes suitable current limiting and power conditioning circuitry to supply other components of sensor 300. In another embodiment, power module 301 may comprise an external power source electrically coupled to sensor 300, for example, a 5 VDC coupled to sensor 300 via a power input port. Controller 302 is coupled to power module 301, communication module 304, interlock 306, laser source module 308 and detection module 310. Controller 302 may include any suitable logic or circuitry that is able to receive a signal from detection circuitry 310, identify or otherwise quantify particles based on the signal from detection circuitry 310 and provide an output via communication module 304. In one embodiment, controller 302 is a microprocessor.

Source 308 is electrically coupled to controller 302 and is configured to direct illumination into the vacuum line. Preferably, source 308 is configured to generate laser illumination having a wavelength in the blue-UV range (i.e. UV wavelengths up to about 480 nm). Further, source 308 is configured to provide relatively high output laser illumination. In one example, the output is about 3.5 watts using a high power blue laser diode. However, a higher power laser illumination can be used as long as the output power is not sufficient to vaporize the particles within the vacuum line. Given the high output power, sensor 300 also preferably includes a laser interlock 306 to ensure that the high-power laser is only engaged when safely contained within the vacuum line (e.g. line 102). In one embodiment, laser interlock is created with a vacuum switch or pressure sensor coupled to controller 302, such that controller 302 only engages source 308 when a sufficient vacuum is present. However, other types of interlocks can also be used in accordance with embodiments of the present invention. Such interlocks include manual switches, manual couplings, or any other suitable manual or automatic structures designed to ensure that the laser is engaged only when safely operating within the flow line (e.g. line 102).

Sensor 300 further includes other electronics 312. Electronics 312 may be coupled externally to sensor 300 via a wired connection (e.g. as shown in FIG. 2) or may be contained within sensor 300 (e.g. as shown in FIGS. 3 and 4). Electronics 312 may comprise any number of electrical components necessary or advantageous to an inline particle sensor, including, but not limited to, WiFi or Bluetooth components, additional power sources, displays, etc.

Although the present invention has been described with reference to preferred embodiments, workers skilled in the art will recognize that changes may be made in form and detail without departing from the spirit and scope of the invention. For example, while embodiments have been described with respect to a vacuum sensor, given the advantages of isolating the electronics from the sensing area, embodiments may be employed in non-vacuum environments where the gas is corrosive and/or toxic.

What is claimed is:

1. An inline particle sensor comprising:
    a cylindrically-shaped sensor head configured to mount within a bore of a fitting, the sensor head including a laser source configured to emit laser light into a vacuum line, the sensor head including detection circuitry configured to provide a signal indicative of particle scattered laser light; and
    electronics coupled to the sensor head and configured to receive the signal from the detection circuitry and provide a particle output based on the signal from the detection circuitry.

2. The inline particle sensor of claim 1, wherein a predominant axis of scattered light detection is approximately orthogonal to a predominant direction of particle flow and simultaneously approximately orthogonal to a predominant laser beam direction.

3. The inline particle sensor of claim 1, wherein the laser source emits a wavelength or wavelengths within the band from vacuum UV to about 480 nm.

4. The inline particle sensor of claim 1, and further comprising a laser interlock.

5. The inline particle sensor of claim 4, wherein the laser interlock is a vacuum switch configured to close below a selected vacuum threshold.

6. The inline particle sensor of claim 4, wherein the laser interlock includes a pressure sensor.

7. The inline particle sensor of claim 1, and further comprising a flow restrictor configured to be positioned in one of the ports of the fitting.

8. The inline particle sensor of claim 1, wherein the fitting is coupled to a vacuum pump line between a vacuum pump and a process chamber.

9. The inline particle sensor of claim 1, wherein the fitting is coupled to a vacuum pump line between a low-pressure vacuum pump and a high-pressure vacuum pump.

10. The inline particle sensor of claim 1, wherein the electronics are externally coupled to the sensor head.

11. The inline particle sensor of claim 1, wherein the electronics are contained within the sensor head.

12. An inline particle sensor system comprising:
    a vacuum pump;
    a vacuum pump line;
    a process chamber;
    a fitting fluidically coupled to the vacuum pump line between the vacuum pump and the process chamber;
    an inline particle sensor inserted into a bore of the fitting and configured to sense scattered light of particles within the sensor system and generate a sensor signal indicative of the presence of the particles; and
    electronics coupled to the vacuum particle sensor configured to receive the sensor signal and generate a particle output based on the sensor signal.

13. The inline particle sensor system of claim 12, wherein the vacuum pump is a low-pressure vacuum pump or a high-pressure vacuum pump.

14. The inline particle sensor system of claim 12, wherein the inline particle sensor comprises a laser source configured to emit a laser at a wavelength from UV to about 480 nm.

15. The inline particle sensor system of claim 14, wherein the laser source has an output power of about 3.5 watts.

16. The inline particle sensor system of claim 12, and further comprising a second inline particle sensor coupled to a second fitting, wherein the second fitting is fluidically coupled to the vacuum pump line between the vacuum pump and the process chamber.

* * * * *